Figure 1:
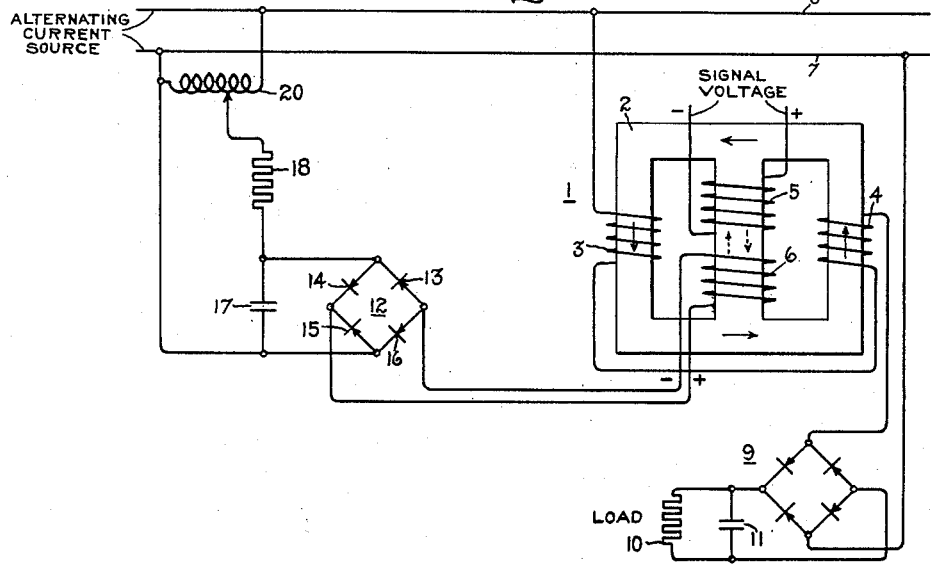

June 29, 1954  R. COHEN ET AL  2,682,632
MAGNETIC AMPLIFIER CIRCUIT
Filed May 20, 1949  2 Sheets-Sheet 1

Inventors:
Robert Cohen,
Herbert F. Storm,
Montgomery Ker,
by *Claude H. Nott.*
Their Attorney.

June 29, 1954   R. COHEN ET AL   2,682,632
MAGNETIC AMPLIFIER CIRCUIT
Filed May 20, 1949   2 Sheets-Sheet 2

Inventors:
Robert Cohen,
Herbert F. Storm,
Montgomery Ker,
by
Their Attorney.

Patented June 29, 1954

2,682,632

UNITED STATES PATENT OFFICE 2,682,632

MAGNETIC AMPLIFIER CIRCUIT

Robert Cohen and Herbert F. Storm, Schenectady, and Montgomery Ker, Scotia, N. Y., assignors to General Electric Company, a corporation of New York Application May 20, 1949, Serial No. 94,306

8 Claims. (Cl. 321—19)

This invention relates to magnetic amplifiers, and more particularly to magnetic amplifiers having provision for the regulation of current flowing through alternating current load windings by means of unidirectional current control windings which vary the saturation of the core of the magnetic amplifier.

It is generally known that the alternating current output of this type of magnetic amplifier is affected by variations in the voltage and frequency of the alternating current source. A reduction in the voltage of the alternating current source decreases the current output of the magnetic amplifier, and an increase in the voltage of the source increases the current output, because the impedances of the load windings of the amplifier remain constant as long as the unidirectional current in the control winding remains constant. A decrease in the frequency of the alternating current, however, increases the current output of the amplifier and an increase in the frequency decreases the current output because a change in frequency causes an inverse change in the impedances of the load windings of the magnetic amplifier.

It is the object of our invention to provide a means for compensating such a magnetic amplifier so that the alternating current output is unaffected by variations in voltage and frequency of the alternating current source.

In carrying out our invention in one form, we provide a magnetic amplifier having a three-legged magnetizable core. The outside legs of the core are provided with alternating current windings which are connected in series in a manner such that the alternating fluxes created by these windings add to each other in the outside legs of the core and counteract each other in the center leg. The center leg is provided with a unidirectional current saturating winding which affects the flow of current through the alternating current windings by changing the saturation of the core and hence the impedances of the alternating current windings. A compensating winding, for providing compensation for variations in voltage and frequency in the source of alternating current, is positioned on the center leg in flux opposition to said saturating winding. The compensating winding is short circuited through a rectifier whereby a component of unidirectional current responsive to even harmonic voltages generated in said compensating winding by alternating flux in the center leg of the core is circulated through the compensating winding. An additional component of unidirectional current is also circulated through said compensating winding to insure complete compensation. The latter component is derived through a rectifier device from a resistance-capacitance circuit which is connected to the source of alternating current.

Figure 2:
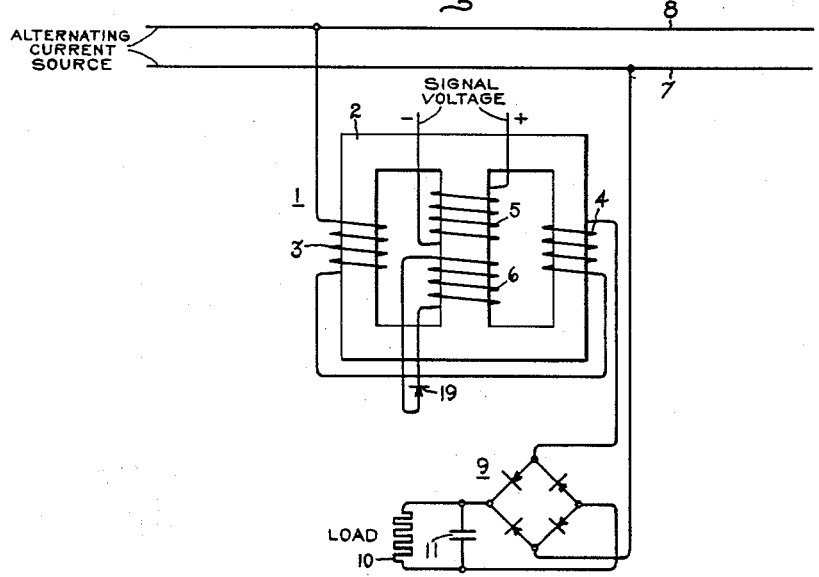
Figure 3:
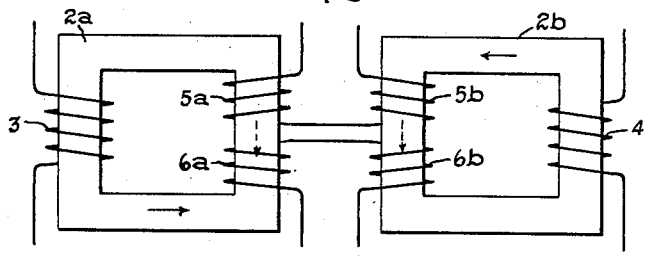
Figure 4:
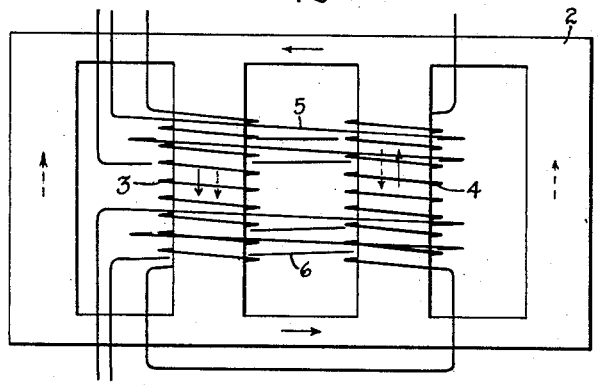
Figure 5:
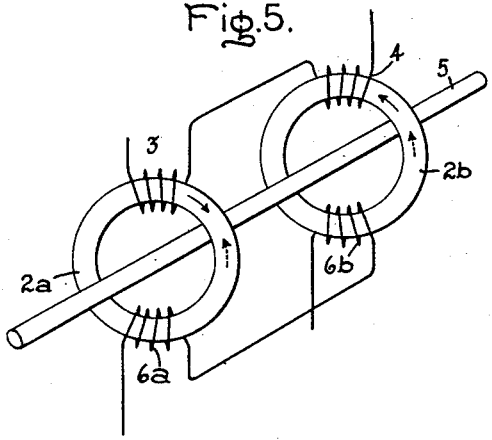

For a clearer and more complete understanding of our invention, reference should be had to the accompanying drawing, Fig. 1 of which is an electrical circuit diagram of a preferred embodiment of the invention; Fig. 2 is an electrical circuit diagram of a modified embodiment thereof; while Figs. 3, 4 and 5 illustrate schematically three modified forms of the core structure of the magnetic amplifier.

Referring first to Fig. 1 of the drawing, the numeral 1 designates a magnetic amplifier having a three-legged magnetizable core 2. The outside legs of the core are provided, respectively, with alternating current load windings 3 and 4, while the center leg has a unidirectional current saturating winding 5 and a compensating winding 6.

Load windings 3 and 4 of the magnetic amplifier are connected in series to a source of alternating current which is represented by two supply conductors 7 and 8. Connected in circuit with the two load windings in this embodiment of the invention is a conventional bridge type full-wave rectifier 9. The unidirectional current output of rectifier 9 is supplied to a load which is represented by a resistor 10. Capacitor 11 is connected between the unidirectional current output terminals of rectifier 9 as a filter for the output current of the rectifier.

Saturating or control winding 5 on the magnetic amplifier is connected to a source of unidirectional current, designated signal voltage on the drawing, which may be considered as constant for purposes of this description. In actual practice, the current through saturating winding 5 may be variable in response to a variable signal voltage, and the function of the magnetic amplifier 1 and the associated rectifier 9 is to produce in resistor 10 an amplified unidirectional current which is uniformly responsive to the unidirectional current in winding 5 irrespective of variations in voltage and frequency of the alternating current source. An example of a use for a circuit as illustrated in Fig. 1 is in a regulating system for a unidirectional current generator. In this case, load 10 represents the regulator, while the current in winding 5 is responsive to the current or voltage of the unidirectional current generator. If the regulating system is required to maintain a constant generator output current, winding 5 is connected across a shunt which is in series with the load being supplied by the generator so that the current in winding 5 is proportional to the current which is to be regulated. If the regulator is to maintain a selected voltage at the terminals of the generator, winding 5 is connected between the generator terminals so that the current in winding 5 is proportional to the generator terminal voltage. The object of our invention is to produce and maintain a uniform current through resistor 10 for a given current in winding 5 regardless of variations in voltage and frequency of the alternating current source, so it is assumed for the remainder of the description of our invention that the current in winding 5 remains constant.

Compensating winding 6 on the center leg of core 2 is connected to the unidirectional current output terminals of a bridge type full-wave rectifier 12 which is composed of four unidirectional conducting devices, 13, 14, 15 and 16. The alternating current input terminals of rectifier 12 are connected in shunt with a capacitor 17 which is connected in series with an adjustable resistor 18 to the alternating current source through a transformer 20. The impedance of resistor 18 is much greater than the impedance of capacitor 17 at the normal alternating current frequency, so that the potential drop across capacitor 17 is a small part of the total potential drop across capacitor 17 and resistor 18. For example, the impedance of resistor 18 in a typical apparatus embodying our invention may be ten times the impedance of capacitor 17.

Load windings 3 and 4 on the outer legs of magnetizable core 2 have the same number of turns and are connected so that the fluxes created by these windings add to each other in the outer legs of the core. During alternate half cycles of the alternating current, which may be considered as the positive half cycles, these fluxes have the direction indicated by the solid arrows on core 2, while the direction is reversed during negative half cycles. It will be readily understood that if windings 5 and 6 are disconnected, there will be substantially no flux in the center leg of core 2 because the magnetomotive forces of the two load windings will substantially counteract each other in the center leg, as symbolized by the dotted arrows. When winding 5 is energized with unidirectional current, the flux produced by the magnetomotive force of this winding will aid the flux of one of the load windings and oppose the flux of the other load winding so that the flux balance in the center leg of the core will be destroyed. This causes alternating flux in the center leg of the core which consists mainly of even harmonics of the fundamental alternating frequency with the second harmonic predominating, although smaller amounts of higher even harmonics are also present. Alternating flux components corresponding to the fundamental frequency of the alternating current and higher odd harmonics are present in the center leg in only a negligible amount, providing the two alternating flux paths are balanced so that they have substantially equal reluctances.

The alternating flux in the center leg of core 2 induces in winding 6 an alternating electromotive force. However, the two terminals of winding 6 are connected together through a circuit composed entirely of unidirectional conducting devices so that the electromotive force induced in winding 6 causes current to flow through this winding in only one direction. This direction is chosen so that the magnetomotive force created by the unidirectional current in winding 6 opposes the magnetomotive force of winding 5.

In addition to the current resulting from the electromotive force induced in winding 6, another component of unidirectional current is made to flow through winding 6 by the difference in potential which exists across the capacitor 17. This component of current flows in the same direction as the component derived from the alternating flux in the center leg of the core so that the total current flowing in winding 6 is the sum of these two component parts.

In the operation of the circuit shown in Fig. 1, a selected unidirectional current is passed through saturating, or control winding 5. This partially saturates core 2, thus reducing the permeability of the core. It follows that the impedances of load windings 3 and 4 on the outer legs of the core are thereby decreased so that the alternating current which flows through the load windings is increased over what it would have been if winding 5 were not energized, thus illustrating the amplifying action of magnetic amplifier 1. It will be readily understood that the total saturating flux is responsive to the difference in the magnetomotive forces of windings 5 and 6. Therefore, a change in the current through winding 6 has an inverse effect on the saturation of the core and, hence, an inverse effect on the output of the magnetic amplifier.

If the potential of the alternating current source increases during the operation of the magnetic amplifier, the output current of the amplifier tends to increase. An increase in the current in load windings 3 and 4, however, increases the flux in core 2 which, in turn, increases the even harmonic electromotive forces which are induced in winding 6 because of increased non-linearity of the magnetization curve at regions of increased saturation of the core. This increases the component of unidirectional current through winding 6 from this source and thus decreases the saturating effect of winding 5, whereby the impedances of windings 3 and 4 are increased and the output current of the amplifier tends to be restored to the original value. Conversely, a decrease in the potential of the alternating current source reduces the flux created by winding 6 in opposition to control winding 5, thus decreasing the impedances of the load windings, and again tending to maintain the output current of the amplifier constant.

An increase in the frequency of the alternating current source tends to reduce the current output of the magnetic amplifier by increasing the impedances of the load windings 3 and 4. Such an increase in frequency also increases the reactance of compensating winding 6, however, thus reducing the amount by which this winding counteracts winding 5. The resulting increase in saturating flux decreases the impedances of the load windings and tends to maintain the output current of the amplifier substantially constant. For a decrease in frequency of the alternating current source, the compensating winding increasingly counteracts winding 5 so that the saturating flux is reduced, thus tending to maintain at a constant value the impedances of load windings 3 and 4, which would otherwise be reduced by the decrease in frequency. Thus, the output current of the amplifier tends to remain substantially unchanged for either a decrease or increase in the frequency of the alternating current source, the same as for a decrease or increase in the voltage of this source.

The characteristics of the auxiliary circuit comprising resistor 18, capacitor 17 and bridge type rectifier 12 are such that it produces a component of unidirectional current in compensating winding 6 which has substantially the same compensating action as the component of current due to the electromotive force which is induced in the winding. If the potential of the alternating current source increases, the potential drop across capacitor 17 increases proportionally. This increases the unidirectional current output of rectifier 12 through winding 6, thus reducing the saturating flux in core 2. This, in turn, increases the impedances of load windings 3 and 4 so as to counteract the effect on the load windings of the potential increase in the alternating current source and assist in maintaining the output current of the magnetic amplifier at a predetermined value. If the potential of the alternating current source decreases, the potential drop across capacitor 17 is decreased, which decreases the current through compensating winding 6. This decreases the impedance of the load windings and again assists in compensating for the change in potential of the alternating current source.

If the frequency of the alternating current source increases, the potential drop across capacitor 17 decreases because the impedance of the capacitor decreases with increased frequency. This decreases the flow of unidirectional current through compensating winding 6 which increases the saturation of core 2, thus decreasing the impedances of load windings 3 and 4. The effect of this is to aid in compensating for the increased impedances of load windings 3 and 4 which would otherwise result from the increase in frequency, so that the output current of the amplifier tends to remain unchanged. For a decrease in frequency, the potential drop across capacitor 17 increases, thus increasing the flow of current through compensating winding 6 and again counteracting, in part, the effect of the frequency change on the impedances of load windings 3 and 4.

It is apparent from the foregoing description that the two components of unidirectional current in compensating winding 6 perform similar functions. The principal reason for the use of the auxiliary circuit comprising resistor 18, capacitor 17 and rectifier 12, in addition to the other source of compensating current, is because it is difficult as a practical matter to secure adequate compensating current by the rectification of harmonic currents only. However, in some cases, where magnetic material having suitable characteristics is used for core 2, it is possible to secure sufficient compensating flux merely by rectifying the even harmonic currents in the compensating winding, and such a modified embodiment of our invention is illustrated in Fig. 2 of the drawing. In this embodiment, compensating winding 6 is short circuited through a unidirectional conducting device 19 which permits current to flow in only one direction. The direction of current flow through winding 6 is such that the magnetomotive force of this winding opposes that of winding 5. The compensating action of winding 6 in this modification for variations in voltage and frequency of the alternating current supply source is the same as that described above in connection with Fig. 1 for the single component of current in winding 6 resulting from the electromotive force induced in this winding by the alternating flux in the center leg of the core.

Referring again to Fig. 1 of the drawing, it will be readily understood that it is possible to utilize only the component of compensating current resulting from the auxiliary resistance-capacitance circuit by making suitable changes in the connections of rectifier 12. The use of this component of current alone, however, does not provide as accurate compensation as the use of the combination of the two compensating current components because the component derived from the auxiliary circuit is not responsive to changes in the saturating current through winding 5, whereas the other component of current resulting from the electromotive force induced in winding 6 is responsive to such changes. More accurate compensation, therefore, results from the use of the latter component of current as the primary source of compensation with any additional compensation which may be required being supplied by the component of current from the auxiliary compensating circuit. For small changes in the current through control winding 5, the characteristics of the combined components of compensating current are such that the current output of the magnetic amplifier is substantially unaffected by changes in voltage and frequency of the source of alternating current. To provide a larger range for the control current through winding 5, an adjustable transformer 20 is used in the auxiliary compensating circuit to provide an adjustment for the amount of compensating current from this source.

In one typical apparatus embodying our invention in which the circuit and core arrangement shown in Fig. 1 was used, we have found that it is possible to maintain the current in resistor 10 within 1 per cent of the normal value for 3 per cent frequency fluctuations above and below normal in the alternating current source and voltage changes in this source between 15 per cent below normal and 28 per cent above normal voltage. These results were obtained for frequency and voltage changes which occurred simultaneously. If one occurs without the other, substantially better results are obtained.

A modification of the core structure of the magnetic amplifier is illustrated by Fig. 3 of the accompanying drawing. In this modification, the magnetizable core is divided into two rectangular sections, 2a and 2b, of approximately identical composition and dimensions. Alternating current windings 3 and 4 are positioned respectively on the outer legs of the two core sections and are connected in series in a manner such that the fluxes produced by the alternating current windings oppose each other in the two adjacent legs of the core sections. The solid arrows in Fig. 3 illustrate the path of the alternating current fluxes during half of the alternating cycle. The saturating winding is divided into two coils, 5a and 5b, having the same number of turns. Coils 5a and 5b are positioned on the inner legs of the two core sections and connected so that the flux produced by unidirectional current through the saturating winding is in the same direction in both sections, as indicated by the dotted arrows. The compensating winding is divided into two coils, 6a and 6b, having the same number of turns. Coils 6a and 6b are positioned respectively on the two inner legs of the core sections and connected so that the unidirectional current passing through the compensating winding opposes the saturating flux in both core sections. Thus, the dotted arrows in Fig. 3 indicate the direction of the net unidirectional flux resulting from the saturating winding and the compensating winding. Inasmuch as this net unidirectional flux adds to one of the alternating fluxes and opposes the other alternating flux, the effect of the compensating winding is the same as described previously for a three-legged magnetizable core. The effects of flux components of the fundamental alternating frequency and odd harmonics of this frequency cancel each other in the compensating winding, but the even harmonic flux components are effective to generate corresponding electromotive forces in the compensating winding.

Another modified form of the magnetic amplifier utilizing a four-legged magnetizable core is illustrated schematically in Fig. 4 of the drawing. In this modification, alternative current windings 3 and 4, which have an equal number of turns, are positioned on the two center legs of the core 2. Windings 3 and 4 are connected in series in a manner such that the alternating fluxes produced by these windings add to each other around the loop indicated by the solid arrows. The saturating winding 5 is positioned around both of the center legs of the core outside of windings 3 and 4. The saturating flux produced by winding 5 is in the same direction in both the center legs of the core, as indicated by the dotted arrows, with return paths for this saturating flux being provided by the two outer legs of the core. Compensating winding 6 is also positioned around both the center legs of the core on the outside of the alternating current windings and, as before, winding 6 is connected so that the magnetomotive force resulting from unidirectional current therein opposes the magnetomotive force of winding 5. Thus, the dotted arrows in Fig. 4 represent the net saturating flux resulting from windings 5 and 6. This flux opposes the alternating flux in one center leg of the magnetizable core and aids it in the other center leg, and the operation of the magnetic amplifier is the same as previously described.

Another modified form of construction for the magnetic amplifier is illustrated by Fig. 5 of the drawing. In this modification, the magnetizable core is divided into two annular sections, 2a and 2b, which are positioned in parallel planes in substantially axial alignment around a conductor 5. The flow of unidirectional current through conductor 5 creates a magnetic field around the conductor which produces flux in core sections 2a and 2b so that conductor 5 may be considered as a single turn saturating coil. The direction of the flux produced by conductor 5 is indicated by the dotted arrows in Fig. 5. Load windings 3 and 4 are positioned on core rings 2a and 2b, respectively, and are connected in series so that the fluxes produced by windings 3 and 4 are opposite in direction, as indicated by the solid arrows. Compensating winding 6 is divided into two coils, 6a and 6b, which are positioned on the two core rings in a manner such that the fluxes produced by the two coils oppose the fluxes produced by conductor 5 in the two rings. Again, the net saturating flux produced by unidirectional current through conductor 5 and unidirectional current through the compensating winding adds to the flux produced by one of the alternating current windings and opposes the flux produced by the other alternating current winding so that the effect of the compensating winding is the same as that previously described.

While we have illustrated and described one preferred embodiment of our invention, together with four modifications thereof, it will be apparent to those skilled in the art that many additional modifications may be made. It should be understood, therefore, that we intend to cover by the appended claims all such modifications as fall within the true spirit and scope of our invention.

What we claim as new and desire to secure by Letters Patent of the United States is:

1. A voltage and frequency compensated magnetic amplifier circuit comprising a source of alternating current electrical energy, a magnetic amplifier having a three-legged magnetizable core, a pair of load windings located respectively on the two outside legs of said core, a saturating winding located on the center leg of said core, and a compensating winding of opposite magnetomotive force to said saturating winding located on said center leg, said load windings being connected in series to said source of alternating current, a bridge type full-wave rectifier having a pair of alternating current input terminals and a pair of unidirectional current output terminals, said input terminals being connected in circuit with said load windings, a current consumption device connected to the output terminals of said rectifier, a resistor, a capacitor connected in series with said resistor to a transformer which is connected to said source of alternating potential energy, and a second bridge type full-wave rectifier having a pair of alternating current input terminals and a pair of unidirectional current output terminals, said second input terminals being connected in shunt with said capacitor, and said second output terminals being connected to said compensating winding.

2. The combination of a magnetic amplifier having a three-legged magnetizable core provided with load windings on the outside legs adapted to be supplied from an alternating current source and having the flux due to said load windings passing in a common direction in part of said core, rectifying means receiving energy from said load windings, a current consumption device receiving energy from said rectifying means, a control winding located on the center leg of said core to vary the saturation of the core and control the flow of energy through said load windings, a compensating winding located on said center leg in flux opposition to said control winding, said compensating winding being short circuited through a rectifier whereby a component of unidirectional current responsive to even harmonic voltages induced in said compensating winding flows through said winding, and means for circulating through said compensating winding an additional component of unidirectional current responsive to variations in voltage and frequency of said alternating current source.

3. The combination of a magnetic amplifier having a three-legged magnetizable core provided with load windings on the outside legs adapted to be supplied from an alternating potential source and having the flux due to said load windings passing in a common direction in part of said core, rectifying means receiving energy from said load windings, a current consumption device receiving energy from said rectifying means, a control winding located on the center leg of said core to vary the saturation of the core and control the flow of energy through said load windings, a compensating winding located on said center leg in flux opposition to said control winding, said compensating winding being short circuited through a plurality of unidirectional conducting devices whereby a component of unidirectional current responsive to even harmonic electromotive forces induced in said compensating winding flows through said winding, and means for circulating through said compensating winding in the same direction as said first component an additional component of unidirectional current responsive to variations in voltage and frequency of said alternating potential source, said means comprising a resistor and a capacitor connected in series to the secondary of a transformer whose primary is connected to said alternating potential source and a bridge type full-wave rectifier made up of said unidirectional conducting devices which is connected in shunt with said capacitor.

4. In combination, a three-legged magnetizable core, load windings on the outer legs of said core, a load circuit including a source of alternating current and said load windings in series in a manner such that the alternating fluxes produced by said load windings in the center leg of said core normally balance each other, a saturating winding on said center leg for producing a unidirectional flux which destroys the normal balance between said alternating fluxes and varies the impedances of said load windings, means responsive to an alternating flux in said center leg for varying said unidirectional flux whereby the impedances of said load winding are varied to compensate for the effects of variations in the voltage and frequency of said source on the current flowing through said load windings, said means comprising a second winding on said center leg in opposite flux relation to said saturating winding and dual means for circulating a unidirectional current through said second winding, one of said dual means comprising at least one unidirectional conducting device connected between the terminals of said second winding whereby a first component of unidirectional current responsive to the electromotive force induced by the alternating flux in said center leg circulates through said second winding, the other of said dual means comprising a resistor and capacitor connected in series to said source of alternating current and a rectifying device connected in shunt with said capacitor, said rectifying device being connected in circuit with said second winding, and a load receiving energy from said load circuit.

5. In combination, a three-legged magnetizable core, load windings on the outer legs of said core, a load circuit including a source of alternating current and said load windings in series in a manner such that the alternating fluxes produced by said load windings in the center leg of said core normally balance each other, a variable current control winding on said center leg for producing a unidirectional flux which destroys the normal balance between said alternating fluxes and varies the impedances of said load windings, means responsive to an alternating flux in said center leg for varying said unidirectional flux whereby the impedances of said load winding are varied to compensate for the effects of variations in the voltage and frequency of said source on the current flowing through said load windings, said means comprising a second winding on said center leg in opposite flux relation to said saturating winding and dual means for circulating a unidirectional current through said second winding, one of said dual means comprising at least one unidirectional conducting device connected between the terminals of said second winding whereby a first component of unidirectional current responsive to the electromotive force induced by the alternating flux in said center leg circulates through said second winding, the other of said dual means comprising a resistor and a capacitor connected in series to said source of alternating current through a transformer and a rectifying device in circuit with said second winding connected in shunt with said capacitor, and a load receiving energy from said load circuit, said load comprising a unidirectional current consumption device in circuit with a rectifying device, the current in said current consumption device varying uniformly with variations in the current in said control winding regardless of variations in the voltage and frequency of said source.

6. The combination of a magnetic amplifier having a divided magnetizable core provided with a load winding on each core section, said load windings being connected in series and adapted to be supplied from an alternating current source, a current consumption device receiving energy through said load windings, a divided control winding comprising two coils located respectively on said core sections to vary the saturation of said core and control the flow of energy through said load windings, said control winding being connected to oppose in one core section the alternating flux due to the load winding and to add in the other core section to the alternating flux due to the load winding, and a divided compensating winding comprising two coils located respectively on said core sections in flux opposition to said control winding to counteract variations in voltage and frequency of said alternating current source, said compensating winding being short circuited through a rectifier whereby a unidirectional current responsive to the electromotive force induced in said compensating winding flows through said compensating winding.

7. The combination of a magnetic amplifier having a four-legged magnetizable core provided with load windings on the inside legs adapted to be supplied from an alternating current source and having the flux due to said load winding passing in a common direction in said inside legs, a current consumption device receiving current through said load windings, a unidirectional current control winding located on said inside legs to vary the saturation of the core and control the flow of current through said load windings, the flux due to said control winding opposing the flux due to said load windings in one inside leg and adding to the flux due to said load windings in the other inside leg, and a compensating winding located on said inside legs in flux opposition to said control winding to compensate for variations in voltage and frequency of said alternating current source, said compensating winding being short circuited through a rectifier whereby a unidirectional current responsive to the electromotive force induced in said compensating winding flows through said compensating winding.

8. In combination, a divided magnetizable core composed of two annular rings provided with load windings on said rings, said load windings being adaptable to be supplied from an alternating current source to produce alternating flux components in said rings, a current consumption device receiving energy through said load windings, a control winding comprising a single unidirectional current conductor extending through the openings in said rings whereby the magnetic field surrounding said conductor produces a unidirectional flux in said rings to vary the saturation thereof and control the flow of energy through said load windings, said unidirectional flux adding to one of said alternating flux components and opposing the other, and a divided compensating winding comprising two coils located respectively on said rings in flux opposition to said unidirectional flux, said compensating winding being short circuited through a rectifier whereby a unidirectional current responsive to the electromotive force induced in said compensating winding flows through said two coils.

References Cited in the file of this patent

UNITED STATES PATENTS

| Number | Name | Date |
|---|---|---|
| 1,812,202 | Dowling | June 30, 1931 |
| 1,834,416 | Osgood | Dec. 1, 1931 |
| 1,920,618 | Zierdt | Aug. 1, 1933 |
| 2,052,978 | Jester | Sept. 1, 1936 |
| 2,169,093 | Edwards | Aug. 8, 1939 |
| 2,306,998 | Claesson | Dec. 29, 1942 |
| 2,331,411 | Milarta | Oct. 12, 1943 |
| 2,377,180 | Pohm | May 29, 1945 |
| 2,399,185 | Hedding | Apr. 30, 1946 |

FOREIGN PATENTS

| Number | Country | Date |
|---|---|---|
| 612,442 | Great Britain | Nov. 12, 1948 |